(12) United States Patent
Wild et al.

(10) Patent No.: US 9,717,266 B2
(45) Date of Patent: Aug. 1, 2017

(54) MULTI-LAYERED DRINK AND A METHOD FOR THE MANUFACTURE THEREOF

(75) Inventors: Hans-Peter Wild, Eppelheim, DE (US); Dominique Chatard, Heidelberg (DE); Robert Sattler, Oftersheim (DE); Katrin Schütz, Eppelheim (DE)

(73) Assignee: RUDOLF WILD GMBH & CO. KG, Eppelheim (DE)

( * ) Notice: Subject to any disclaimer, the term of this patent is extended or adjusted under 35 U.S.C. 154(b) by 1602 days.

(21) Appl. No.: 12/433,161

(22) Filed: Apr. 30, 2009

(65) Prior Publication Data

US 2009/0291187 A1 Nov. 26, 2009

(30) Foreign Application Priority Data

May 26, 2008 (EP) ...................................... 08009575

(51) Int. Cl.
| | |
|---|---|
| *A23L 1/05* | (2006.01) |
| *A23L 2/52* | (2006.01) |
| *A23P 20/20* | (2016.01) |
| *A23L 29/262* | (2016.01) |

(52) U.S. Cl.
CPC ............... *A23L 2/52* (2013.01); *A23L 29/262* (2016.08); *A23P 20/20* (2016.08)

(58) Field of Classification Search
CPC ........ A23L 1/0067; A23L 1/0534; A23L 2/52; A23L 29/262; A23P 20/20
USPC .......................................... 426/590, 573, 592
See application file for complete search history.

(56) References Cited

U.S. PATENT DOCUMENTS

| | | | | |
|---|---|---|---|---|
| 6,048,567 A | * | 4/2000 | Villagran et al. ............. | 426/594 |
| 6,228,415 B1 | * | 5/2001 | Jimenez-Laguna et al. . | 426/565 |
| 6,737,098 B1 | * | 5/2004 | Devine et al. ................ | 426/576 |
| 7,013,933 B2 | * | 3/2006 | Sher et al. ...................... | 141/99 |

FOREIGN PATENT DOCUMENTS

| | | |
|---|---|---|
| EP | 1 415 548 A1 | 5/2005 |
| FR | 2 655 241 | 6/1991 |
| SU | 1718786 A1 | 3/1992 |
| WO | WO 00/30470 | 6/2000 |
| WO | WO 2005/046409 A1 | 5/2005 |

OTHER PUBLICATIONS

FMC Biopolymer. RD443053. Mar. 2001. Drink beverage having distinct color and/or flavor in individual layers.*
Wikipedia Layered drink pp. 1, 2, taken from https://en.wikipedia.or/wiki/Layerd_drink, Sep. 13, 2016.*
Graham, C. 1960, Jun. 26, 2006, Specific Gravity Chart for Layering Drinks, pp. 1-18 taken from http://cocktails.about.com/od/cocktailrecipes/1/shtr_recipes.htm.*
FMC Biopolymer (RD443053) "Drink beverage having distinct color and/or flavor in individual layer", pp. 1-2, Mar. 2001. www.researchdisclosure.com.*
Marchel et al., "Home-made alcohol drinks," Minsk Literatura, 1998, pp. 182-184 (in Russian with partial English translation attached) (4 pages).
European Search Report for corresponding European Patent Application No. 08009575 dated Oct. 13, 2008 (2 pages).

* cited by examiner

*Primary Examiner* — Helen F Heggestad
(74) *Attorney, Agent, or Firm* — Kilyk & Bowersox, P.L.L.C.

(57) ABSTRACT

The present invention relates to a multi-layered drink in which the adjacent layers have a difference in density of 0.4 to 10 kg/m$^3$ and each layer contains at least one hydrocolloid.

13 Claims, No Drawings

MULTI-LAYERED DRINK AND A METHOD FOR THE MANUFACTURE THEREOF

This application claims the benefit of earlier filed European Patent Application No. 08009575.5 filed May 26, 2008, incorporated in its entirety by reference herein.

BACKGROUND OF THE INVENTION

Field of the Invention

The present invention relates to a multi-layered drink and a method for the manufacture thereof.

Description of Related Art

There is a great interest in offering drinks in an attractive manner as concerns the taste as well as the appearance of them. A drink consisting of several separate layers has a particularly attractive effect thanks to the abundant colors and the various separate layers, as each layer can be drunk separately, or a combination of different layers can be drunk together. Such a product and a simple and fast manufacture of such a product are therefore very interesting for the gastronomy sector.

In general, there are the following possibilities of manufacturing a multi-layered drink:
  arrangement in layers due to different densities
  arrangement in layers due to different viscosities
  arrangement in layers due to a combination of different densities and different viscosities
  arrangement in layers due to different states of aggregation (liquid, frozen, frothy)

Multi-layered drinks that are layered due to different densities are, for example, cocktails. For the manufacture of a multi-layered cocktail, the individual layers have to be combined particularly carefully. In the process, the individual ingredients of the drink are carefully poured in over a spoon, so that they do not intermingle. It is thereby possible to form several layers of different colors. The ingredients used for this are layered according to their density. That means, first, the ingredient having the highest density is filled into the vessel as the lower layer. The further ingredients are each filled in with decreasing density. However, these individual layers are not stable; after some time, they intermingle completely. Moreover, the ingredients are not separated by a clear phase boundary.

Multi-layered soft drinks can also be prepared by building up individual layers of drinks, such as juices. In this case, too, the individual ingredients are selected such that there are several separate layers due to a difference in density. However, they also intermingle after some time.

An arrangement in layers on the basis of different densities is also described in WO 2005/046409. This document discloses a method and a device for the manufacture of multi-layered drinks. Differences in the density of the individual liquid layers permit to prepare a drink exhibiting clearly separated and stable layers. The desired difference in density of the individual layers is achieved by adjusting a drink concentrate to a certain density by adding water. Here, it is necessary for the difference in density between the individual layers to be at least 0.1% to obtain clearly separated layers. However, a slow addition of the individual layers is required to reduce turbulences. To minimize an intermingling of the individual layers due to diffusion or convection of the liquids, a break must be made after one layer has been added. In particular in case of hot drinks, it is additionally necessary to check the temperature of the individual layers. As greater turbulences and an accelerated diffusion occur at higher temperatures, the individual layers have to exhibit a temperature gradient where the lower layer has to be colder than the upper layer. Thus, the described method represents a time consuming and complicated method. In case of fruit juices, it moreover has to be taken into consideration that various fruit juices generally have very similar densities. It is therefore necessary to increase the density by adding a weighting agent, such as sugar.

An arrangement in layers on the basis of different viscosities is described in Research Disclosure 2001, 443, page 388, ID.-No. 443053. Here, a two-layered drink of which the individual layers comprise different viscosities is prepared. Here, the individual layers contain different hydrocolloids in an aqueous solution, e.g. propylene-glycol-alginate and modified starch. In addition, colorants and flavoring agents can be added to individual layers. The individual layers can also be formed again after the drink has been mixed. High viscosity, however, always involves an unpleasant feeling in the consumer's mouth.

An arrangement in layers on the basis of a combination of different densities and viscosities is described in EP-A-1 415 548. Here, a two-phase drink is disclosed, where the lower phase has a density that is higher by at least 0.02 kg/dm$^3$ (20 kg/m$^3$) than that of the upper phase. In addition, one of the phases contains xanthan for modifying the viscosity, and at least one further hydrocolloid is added to the other phase. The hydrocolloids serve as stabilizers to permit a clear separation of the two phases. Here, the individual phases have a difference in density as well as a difference in viscosity to make intermingling difficult. However, in spite of the use of hydrocolloids as stabilizers, it is necessary for the difference in density of the individual phases to be at least 0.02 kg/dm$^3$ (20 kg/m$^3$). If the density of the lower phase is below 1.094 kg/dm$^3$ (1094 kg/m$^3$), and the density of the upper phase is below 1.05 kg/dm$^3$ (1050 kg/m$^3$), clear phase separation is only achieved if the difference in density is at least 0.03 (30 kg/m$^3$) or 0.04 kg/dm$^3$ (40 kg/m$^3$).

An arrangement in layers on the basis of different states of aggregation is known e.g. from coffee drinks that have an upper layer of milk froth. Such a frothy layer, however, is not stable but collapses after some time. Even a frozen layer is not stable as this layer will melt when it is left at room temperature.

BRIEF SUMMARY OF THE INVENTION

It is the object of the present invention to provide a multi-layered drink that can be manufactured as easily and as quickly as possible and that comprises a permanent and clear separation of the layers as well as stable layers.

This object is achieved by a multi-layered drink characterized in that the adjacent layers have a difference in density of 0.4 to 10 kg/m$^3$, and that each layer contains at least one hydrocolloid.

The object is also achieved by a method for the manufacture of such a multi-layered drink, characterized in that several layers are mixed separately with at least one hydrocolloid, one of these layers is filled into a container, subsequently the adjacent layer is added by metered addition by means of a filling device, and possibly at least one further layer is added by metered addition in the same manner, the adjacent layers comprising a difference in density of 0.4 to 10 kg/m$^3$.

DETAILED DESCRIPTION OF THE INVENTION

According to the invention, "multi-layered" means optically clearly separated areas of different liquids. Here, a respective layer can also be a non-homogenous area, such as an emulsion. Thus, the term "layer" differs from the term "phase", as a phase represents a homogenous area.

The drink according to the invention preferably comprises two, three, four, five or six layers. It is particularly preferred for the drink to consist of three or four layers.

The adjacent layers in the drink according to the invention exhibit a difference in density of 0.4 to 10 kg/m³. Preferably, the difference in density of the adjacent layers is 0.4 to 5 kg/m³, particularly preferred 0.4 to 1 kg/m³.

Each layer of the drink according to the invention contains at least one hydrocolloid; preferably, each layer contains the same hydrocolloid. The employed hydrocolloids increase the viscosity of the respective layer. By the increase of the viscosity, the individual layers are stabilized. The hydrocolloids thus serve as thickeners, binders and stabilizers and impart a desired consistency and texture to the individual layers.

According to the invention, any common hydrocolloids, such as xanthan, locust bean gum, starch, modified starch, guar gum, pectin, modified cellulose, agar, carrageen, alginate, gelatin, gum arabic or mixtures thereof can be used. Preferably, pectin, locust bean gum or carboxymethylcellulose, particularly preferred carboxymethylcellulose, are used as hydrocolloid. Preferably, each layer of the drink according to the invention contains carboxymethylcellulose. By the sole use of carboxymethylcellulose, a clear solution can be obtained which can be employed in clear drink layers.

The hydrocolloid content in the drink according to the invention is usually 0.05 to 2 weight percent. Preferably, the drink according to the invention contains 0.1 to 0.5 weight percent of at least one hydrocolloid, particularly preferred 0.2 to 0.3 weight percent of at least one hydrocolloid.

If it is an alcoholic drink, the individual layers preferably contain 10 to 30 weight percent of alcohol.

The multi-layered drink according to the invention can contain conventional base materials for beverages. These include base materials for clear juicy drinks, for cloudy juicy drinks, for emulsion drinks, for coke drinks, for tea and coffee drinks, for near water drinks (drinks without juice content), for soy drinks, for milk drinks, for malt drinks, for energy drinks and for sports drinks. The multi-layered drink preferably contains base material for clear drinks or cloudy juicy drinks, particularly preferred clear base materials for beverages. Furthermore, various base materials for beverages can be used in combination.

If the drink according to the invention is a juicy drink, the multi-layered drink comprises a fruit content of 3 to 100%. Preferably, the juice content is 10 to 60%, particularly preferred 20 to 30%.

Fruit of any kind can be contained in the juice drinks. It was found out that multi-layered drinks based on combinations of carrot/lime/blood orange, apple/cherry/orange and cherry/mango/blood orange are particularly attractive.

Furthermore, one or more of the liquid layers can include solid ingredients, e.g. fruit particles of a defined size, coated nanoparticles and/or fruit ingredients bound with hydrocolloids. One or several layers can be an emulsion.

The drink according to the invention can contain natural and/or artificial sweeteners. Common natural sweeteners are e. g. carbohydrates, such as sugar, invert sugar syrup, glucose syrup or fructose syrup, natural sweeteners, such as thaumatine, or neohesperidine, and sugar alcohols, such as sorbitol, maltitol, mannitol, isomalt, maltitol syrup, xylite, or lactite. Common artificial sweeteners are e.g. aspartame, acesulfam, sodium cyclamate, sodium saccharin or sucralose. These sweeteners can be employed individually or in combinations of two or several sweeteners. Preferably, the drink according to the invention is sweetened with carbohydrates, particularly preferred with invert sugar syrup.

Furthermore, the multi-layered drink according to the invention can contain, as further additions, citric acid, trisodium citrate, flavoring agents, flavors, colorants, fruit concentrates, functional ingredients, emulsifying agents, food preservatives, fatty substances, milk products, cream, yoghurt, whey and buttermilk, as well as combinations of two or more additions. Preferred additions are fruit concentrates, citric acid, trisodium citrate, flavoring agents, flavors, colorants, functional ingredients, emulsifying agents, particularly preferred are fruit concentrates, flavors, citric acid, functional ingredients, colorants.

The drink according to the invention can contain one or several weighting agents. As weighting agent, for example glucose syrup, maltodextrin, saccharose, dextrose, fructose and soluble dietary fibers can be used. Preferably, the multi-layered drink according to the invention contains invert sugar syrup, glucose syrup, saccharose, particularly preferred invert sugar syrup.

The multi-layered drink according to the invention comprises stable, clearly separated layers which are still separate after having been left standing for a period of 24 h.

Due to the low amounts of hydrocolloids employed, the viscosity of the individual layers is low. This creates a pleasant feeling in the consumer's mouth.

If cloudy base materials for beverages are used, an existing cloudiness has no influence on the separation of the layers. Even if alcohol is added, the layers are stable.

The drink is stable during normal transport, for example when it is carried on a tray.

Advantageously, during the manufacture of the drink according to the invention not too much air is introduced into the layers or an adequate standing time for degassing is observed, so that existing air bubbles can escape from the mixture. If the upper layer is a foamed layer, only the layers situated below it are degassed.

In the method according to the invention, a filling device of any type can be used. The filling device is preferably a long-tube filling valve or a straw. Furthermore, the filling device is preferably designed such that the liquid is oriented at the walls of the container. The filling device can immerse in already filled in liquid.

If a straw is used as filling device, the same can be subsequently given to the customer together with the drink container. Thus, no subsequent cleaning of the filling device is necessary, and the risk of microbial contamination of the base materials is clearly reduced.

EXAMPLES

A drink according to the invention having the following layers was prepared:

Example 1

| Raw material | Proportion in weight percent |
|---|---|
| Upper layer | |
| Basic material apple | 10.5 |
| CMC | 0.25 |
| Water | 89.25 |
| Density | 1032 kg/m³ |

| Raw material | Proportion in weight percent |
|---|---|
| Viscosity | 28.7 mPa * s |
| Brix | 7.50°Brix |
| Central layer | |
| Basic material cherry | 2 |
| Sugar, solid | 9 |
| CMC | 0.25 |
| Water | 88.75 |
| Density | 1040 kg/m³ |
| Viscosity | 10.8 mPa * s |
| Brix | 9.8°Brix |
| Lower layer | |
| Basic material orange | 2 |
| Sugar, solid | 10 |
| CMC | 0.25 |
| Water | 87.75 |
| Density | 1050 kg/m³ |
| Viscosity | 7 mPa * s |
| Brix | 12°Brix |

The individual layers were prepared separately. In the process, the hydrocolloid was in each case completely dissolved in the given quantity of cold water or in a portion thereof. If one layer contained sugar, the sugar was dissolved in the remaining water. Then, the base material, the sugar solution and the hydrocolloid solution were combined and mixed by means of an agitator.

Subsequently, the layers were degassed and built up in layers according to their densities by means of a filling device. First the upper layer was filled into the container, then the central layer was filled in below it, and subsequently the lower layer was filled in below the central layer. The filling of one layer below the other layer was performed in an order with increasing density.

Due to the difference in density and the increased viscosity, the layers did not intermingle. The arrangement in layers was even maintained when the container was moved (carried). By an alteration of cloudy and clear drink layers, an optically attractive contrast was moreover achieved.

Comparative Example 1

| Raw material | Proportion in weight percent |
|---|---|
| Upper layer | |
| Carrot juice concentrate | 14.3 |
| Water | 85.7 |
| Density: 1040 kg/m³ | |
| Central layer | |
| Grape juice concentrate | 24.5 |
| Water | 75.5 |
| Density: 1045 kg/m³ | |
| Lower layer | |
| Mango puree concentrate | 24.7 |
| Water | 75.3 |
| Density: 1050 kg/m³ | |

The given quantity of the juice concentrate was mixed with the described quantity of water. The layers were degassed and built up as described in Example 1.

No stable multi-layered drink was obtained. A short-time arrangement in layers was possible, however, at only slight shaking, e.g. by moving the container, a mixing or penetration of the individual layers occurred.

Comparative Example 2

| Raw material | Proportion in weight percent |
|---|---|
| Upper layer | |
| Flavor basic material 1 (lilac) | 0.5 |
| CMC | 0.2 |
| Water | 97.3 |
| Lower layer | |
| Flavor basic material 2 (yellow) | 0.5 |
| CMC | 0.2 |
| Water | 97.3 |

Density: 1003 kg/m³

The individual layers were prepared separately. In the process, the hydrocolloid was completely dissolved in the given quantity of cold water. Then, the base material was added to the hydrocolloid solution and mixed by means of an agitator. The layers were degassed and built up as described in Example 1.

During the attempt of arranging the two layers, immediate mixing occurred. An arrangement in layers was not possible.

The invention claimed is:

1. Multi-layered drink, characterized in that 3, 4, 5, or 6 adjacent layers have a difference in density of 0.4 to 10 kg/m³, and that each layer contains at least one hydrocolloid, and the multi-layered drink comprises a clear and permanent separation of the 3, 4, 5, or 6 layers as well as stable layers.

2. Multi-layered drink according to claim 1, characterized in that the difference in density is 0.4 to 5 kg/m³.

3. Multi-layered drink according to claim 1, characterized in that the difference in density is 0.4 to 1 kg/m³.

4. Multi-layered drink according to claim 1, characterized in that each layer contains the same hydrocolloid.

5. Multi-layered drink according to claim 1, characterized in that the content of hydrocolloid in each layer is 0.05 to 2 weight percent.

6. Multi-layered drink according to claim 1, characterized in that the content of hydrocolloid in each layer is 0.1 to 0.5 weight percent.

7. Multi-layered drink according to claim 1, characterized in that the at least one hydrocolloid is carboxymethylcellulose.

8. Multi-layered drink according to claim 1, characterized in that at least one layer contains 10 to 30 weight percent of alcohol.

9. Method for the manufacture of a multi-layered drink according to claim 1, characterized in that several layers are mixed separately with at least one hydrocolloid, one of these layers is filled into a container, subsequently the adjacent layer is added by metered addition by means of a filling device, and optionally at least one further layer is added by metered addition in the same manner, wherein the adjacent layers comprise a difference in density of 0.4 to 10 kg/m³.

10. Method according to claim 9, characterized in that the filling device is a long-tube filling valve or a straw.

11. Method according to claim 9, characterized in that the filling device is designed such that the liquid is oriented at the walls of the container.

12. Method according to claim 9, characterized in that the filling device is designed such that the liquid can be built up in a layer either above or underneath the other layer.

13. Multi-layered drink according to claim 1, characterized in that the hydrocolloid contained in each layer increases viscosity of each respective layer, wherein each of the layers is stabilized to provide stable, clearly separated adjacent layers.

* * * * *